US011629982B2

(12) United States Patent
Mariager (10) Patent No.: US 11,629,982 B2
(45) Date of Patent: Apr. 18, 2023

(54) MAGNETIC-INDUCTIVE FLOWMETER AND MEASURING POINT HAVING A MAGNETIC-INDUCTIVE FLOWMETER OF THIS TYPE

(71) Applicant: Endress+Hauser Flowtec AG, Reinach (CH)

(72) Inventor: Simon Mariager, Basel (CH)

(73) Assignee: Endress+Hauser Flowtec AG, Reinach (CH)

( * ) Notice: Subject to any disclaimer, the term of this patent is extended or adjusted under 35 U.S.C. 154(b) by 277 days.

(21) Appl. No.: 17/045,543

(22) PCT Filed: Mar. 7, 2019

(86) PCT No.: PCT/EP2019/055720
§ 371 (c)(1),
(2) Date: Oct. 6, 2020

(87) PCT Pub. No.: WO2019/192799
PCT Pub. Date: Oct. 10, 2019

(65) Prior Publication Data
US 2021/0164814 A1   Jun. 3, 2021

(30) Foreign Application Priority Data

Apr. 6, 2018 (DE) ..................... 10 2018 108 197.9

(51) Int. Cl.
*G01F 1/58* (2006.01)
*G01F 25/10* (2022.01)

(52) U.S. Cl.
CPC .............. *G01F 1/584* (2013.01); *G01F 25/10* (2022.01); *G01F 1/58* (2013.01)

(58) Field of Classification Search
CPC ............. G01F 1/584; G01F 25/10; G01F 1/58
See application file for complete search history.

(56) References Cited

U.S. PATENT DOCUMENTS

| 4,008,609 A | 2/1977 | Lambrecht et al. |
| 4,290,312 A | 9/1981 | Kobayashi |
| (Continued) | | |

FOREIGN PATENT DOCUMENTS

| CN | 101294832 A | 10/2008 |
| CN | 107073191 A | 8/2017 |
| (Continued) | | |

OTHER PUBLICATIONS

Eckardt, J.C.; English translation of document DE 1227677 cited as foreign patent document 2 on the IDS filed Oct. 6, 2020, publication date Oct. 27, 1966 (Year: 1966).*

*Primary Examiner* — Alexander A Mercado
*Assistant Examiner* — John M Royston
(74) *Attorney, Agent, or Firm* — Christopher R. Powers; Endress+Hauser (USA) Holding, Inc.

(57) ABSTRACT

The present disclosure relates to a magnetic-inductive flowmeter for measuring flow velocity of a medium, comprising a measuring tube; an apparatus positioned toward a cross-section of the measuring tube for producing a magnetic field extending perpendicular to a longitudinal direction, wherein the apparatus includes a segment coupling the magnetic field into the medium, wherein the segment surrounds the measuring tube over a first angle; and an electrode system having at least two electrode pairs adapted to register a voltage induced in the medium, wherein a second angle defines a minimum circular sector in which the electrodes located on one side of the measuring tube are distributed, wherein first and second angles are so matched to one another that the flowmeter is insensitive to departures from a rotationally symmetric flow such that the flowmeter in a test measurement has a measurement error of flow velocity less than 1.0%.

22 Claims, 5 Drawing Sheets

(56) References Cited

U.S. PATENT DOCUMENTS

| | | | | |
|---|---|---|---|---|
| 4,545,259 | A | * 10/1985 | Jensen | G01F 1/662 |
| | | | | 73/861.28 |
| 5,301,556 | A | 4/1994 | Nissen et al. | |
| 6,094,992 | A | 8/2000 | Mesch et al. | |
| 9,383,237 | B2 | * 7/2016 | Wiklund | G01F 1/663 |
| 2008/0127712 | A1 | 6/2008 | Baker | |
| 2009/0260452 | A1 | * 10/2009 | Rasmussen | G01F 25/10 |
| | | | | 73/861.12 |
| 2010/0107776 | A1 | 5/2010 | Shanahan | |
| 2013/0036817 | A1 | 2/2013 | Lucas et al. | |

FOREIGN PATENT DOCUMENTS

| | | |
|---|---|---|
| DE | 1227677 | 10/1966 |
| DE | 1227677 B1 | 10/1966 |
| DE | 1914335 A1 | 12/1970 |
| DE | 102006014679 A1 | 10/2007 |
| DE | 102011079351 A1 | 1/2013 |
| DE | 102011079352 A1 | 1/2013 |
| DE | 102014113408 A1 | 3/2016 |
| DE | 102015113390 A1 | 3/2017 |
| EP | 0878694 A1 | 5/1997 |
| EP | 0878694 A1 | 11/1998 |
| EP | 3184969 A1 | 6/2017 |
| GB | 2292613 A1 | 2/1996 |
| JP | 5860219 A | 4/1983 |
| JP | 08247812 A | 9/1996 |
| WO | 2011128656 A1 | 10/2011 |
| WO | 2015140574 A1 | 9/2015 |
| WO | 2017025314 A1 | 2/2017 |

* cited by examiner

MAGNETIC-INDUCTIVE FLOWMETER AND MEASURING POINT HAVING A MAGNETIC-INDUCTIVE FLOWMETER OF THIS TYPE

CROSS-REFERENCE TO RELATED APPLICATIONS

The present application is related to and claims the priority benefit of German Patent Application No. 10 2018 108 197.9, filed on Apr. 6, 2018, and International Patent Application No. PCT/EP2019/055720, filed on Mar. 7, 2019, the entire contents of which are incorporated herein by reference.

TECHNICAL FIELD

The present invention relates to a magnetic-inductive flowmeter, comprising two electrode pairs for measuring flow velocity or volume flow of a medium having a rotationally asymmetric flow profile.

BACKGROUND

Magnetic-inductive flowmeters are employed for determining flow velocity and volume flow of a medium in a measuring tube. A magnetic-inductive flowmeter includes a magnet system, which produces a magnetic field perpendicular to the flow direction of the medium. For such purpose, usually one or more coils are used. In order to implement a predominantly uniform magnetic field, supplementally, pole shoes are so formed and placed that the magnetic field lines extend essentially perpendicular to the measuring tube axis over the total tube cross-section. An electrode pair in the lateral surface of the measuring tube senses an electrical voltage dropping perpendicular to the flow direction and to the magnetic field. This voltage arises, when a conductive medium flows in the flow direction in the presence of a magnetic field. Since the voltage registered depends, according to Faraday's law of induction, on the velocity of the flowing medium, flow velocity u. Using a known tube cross-section, volume flow V can also be ascertained from the voltage.

Magnetic-inductive flowmeters can be influenced by the flow profile of the medium. Depending on pipe system and measuring device, measurement errors of several percent can occur due to this influence. Usually, consequently, a straight pipe, whose length is at least 5 to 10 times the nominal diameter of the measuring tube, is placed before the inlet end of the measuring device. There are, however, applications, in which this minimum distance, the so-called the inlet path, cannot be provided. Such is, for example, the case, when a pipe system is located in tight quarters. One solution is provided by the invention of DE 10 2014113408 A1, in the case of which a narrowing of the tube diameter leads to conditioning of the flow, whereby the influence of the flow profile is minimized, so that a 0-DN inlet path can be used. Disadvantageous in the case of this embodiment is, however, that, indeed, a lower sensitivity to rotationally asymmetric flow profiles can be implemented, but a pressure loss results, so that it must be a situation where that can be tolerated. Moreover, these embodiments are limited to pipe systems where DN<350.

The sensitivity of the flow measurement to a rotationally asymmetric flow-profile depends on the geometry of the measuring tube and the electrodes. Therefore, the influences of the tube and electrode geometries must be taken into consideration for the correct description of the velocity dependent induction voltage. The two influences are described mathematically by a weighting function WF.

The influence of the geometry on the flow can best be indicated by the following equation:

$$U(x) = \int_V u(x')WF(x',x)dV$$

wherein, for determining the voltage U(x), flow velocity u(x') and the weighting function WF(x',x) are integrated over the volume of the measuring tube. In such case, the weighting function WF is described based on WF(x',x)=B× ∇G(x',x) using the magnetic field B(x') and a Green's function G, which is given by the electrical boundary conditions. The goal of an optimizing method is to optimize the geometry of the structure such that ∇×GF=0 holds in the total flow profile. Such is, however, not possible for a tube with a single, point shaped electrode pair. A possible approach to a solution is the adapting of the electrode form. Such is, however, not practical and causes new difficulties. A further approach to a solution is to use a plurality of electrode pairs.

Thus, for example, known from CN 101294832 A is a magnetic-inductive flowmeter, which has two electrode pairs, which are arranged axisymmetrically in a tube cross-section, in order, thus, to minimize the influence of the flow profile on the determining of volume flow. The two electrode axes defined by the different electrode pairs form between them, in such case, in the cross-section of the measuring tube an angle of about 40°.

Another approach is disclosed in DE 10 2015113390 A1, in which second and third electrode pairs are arranged on defined electrode axes, which are arranged at an angular measure of less than or equal to ±45° relative to a first electrode axis oriented perpendicular to the magnetic field.

EP 0878694 A1 discloses likewise a magnetic-inductive flowmeter, which, starting from the state of the art, provides an improvement of the accuracy of measurement in the range of measurement errors under 1% by the use of two additional electrode pairs, whose electrode axes define angles of about 45° relative to the electrode axis of the conventional electrode pair about the measuring tube axis. Such is especially achieved by individually registering and weighting the potential differences acting on the electrodes.

Disadvantageous in the case of these embodiments, however, is that, indeed, for small diameters, the accuracy of measurement is optimized, yet, in the case of conventional measuring tubes with large nominal diameters they do not achieve the desired reduction of the measuring error. Moreover, disadvantageous is that for each electrode pair a weighting factor must be taken into consideration, wherein it is not immediately obvious how these weighting factors should be selected as a function of the pipe system, or the rotationally asymmetric flow profile.

SUMMARY

Starting from this state of the art, an object of the present invention is to provide a magnetic-inductive flowmeter, which minimizes the influences of a rotationally asymmetric flow profile on the determining of flow velocity and volume flow.

The object of the invention is achieved by the magnetic-inductive flowmeter as defined in independent claim 1 and by a measuring point as defined in independent claim 13.

A magnetic-inductive flowmeter of the invention for measuring flow velocity u or volume flow $\dot{V}$ of a medium includes a measuring tube for conveying the medium in a longitudinal direction defined by a measuring tube axis, wherein the measuring tube has an inlet end area and an outlet end area, which delimit the measuring tube in the longitudinal direction, at least one magnetic field producing apparatus positioned toward a cross-section of the measuring tube for producing in the medium a magnetic field extending essentially perpendicular to the longitudinal direction, wherein the magnetic field producing apparatus is characterized by a segment coupling the magnetic field into the medium and applied on, or at a predetermined minimum distance from, the measuring tube, wherein the segment surrounds the measuring tube over a maximum angle of arc $\beta$ in the cross-section of the measuring tube, an electrode system having at least two electrode pairs, which are adapted to register a voltage in the medium induced perpendicular to the magnetic field and to the longitudinal direction, wherein a vertical measuring tube longitudinal plane divides the measuring tube into a first side and a second side, wherein, in each case, a first electrode of an electrode pair is located on the first side of the measuring tube, wherein, in each case, a second electrode of an electrode pair is located on the second side of the measuring tube, wherein an angle $\alpha$ in the cross-section of the measuring tube defines a minimum circular sector, in which the electrodes located, in each case, on one side of the measuring tube are distributed, characterized in that the angles $\alpha$ and $\beta$ are so matched to one another that the flowmeter is insensitive to departures from a rotationally symmetric flow to a degree such that the magnetic-inductive flowmeter in a test measurement has a measurement error of flow velocity $$\Delta_u = \left|\frac{u_{va} - u_S}{u_{va}}\right|$$

and/or a measurement error of volume flow $$\Delta_{\dot{V}} = \left|\frac{\dot{V}_{va} - \dot{V}_S}{\dot{V}_{va}}\right|$$

of less than 1.0%, especially less than 0.5% and preferably less than 0.2%, wherein a flow velocity u and/or a volume flow $\dot{V}_{va}$ are/is determined in the case of a flow with fully developed flow profile, wherein a flow velocity $u_S$ and/or a volume flow $\dot{V}_S$ are/is determined in the case of a rotationally asymmetric flow.

A magnetic-inductive flowmeter, which is insensitive to a rotationally asymmetric flow profile, is ideal for monitoring tube and pipe systems, in the case of which an inlet path, whose length corresponds to a multiple of the nominal diameter of the measuring tube, cannot be implemented.

After disturbances there occur, depending on distance and type of disturbance, because of a non-ideal flow profile, measurement errors, since a magnetic-inductive flowmeter normally is designed and has been optimized assuming that a fully developed, rotation symmetric flow profile is present. In a fully developed, rotation symmetric flow profile, the flow profile is developed such that it no longer changes in the flow direction. Such a flow profile forms, for example, in a measuring tube having an inlet path, which is 30 times measuring tube nominal diameter, and a medium velocity of 2 m/s.

Already known in the state of the art are magnetic-inductive flowmeters having at least two electrode pairs, which define an angle $\alpha$ in the cross-section of the measuring tube. Usually, adjoining electrodes define an angle $\delta$ with fixed angular value of about 180°/(N+1), wherein the natural number N corresponds to the number of electrode pairs. With a weighting of the potential differences occurring separately on the electrodes, measurement errors of less than 1% can be achieved for rotationally asymmetric flow profiles. It has surprisingly been found that measurement errors occurring due to a rotationally asymmetric flow profile can be significantly reduced further by modifying the angles $\alpha$ and $\beta$.

The angle $\beta$ serves, in such case, as a characteristic variable for the magnetic field producing apparatus and gives the extent to which the segment of the magnetic field producing apparatus coupling the magnetic field into the medium passes around the measuring tube in the cross-section. While a small angle leads to the magnetic field lines being concentrated exclusively in the center of the measuring tube, use of a large angle $\beta$ provides a uniform magnetic field basically over the entire cross-section of the measuring tube.

Known are magnetic field producing apparatuses, which comprise a guide material in the outer region and at least one shielding element between a pole shoe and the guide material and/or above the guide material and the electromagnets. These segments fulfill the task of reducing disturbance or stray fields and are not responsible for coupling the magnetic field into the medium.

The measuring tube is electrically insulating on its inside contacting the medium, and, indeed, in one approach, e.g., by making the measuring tube completely of an insulating material, especially of sintered ceramic, preferably of aluminum oxide ceramic, or a plastic. On the other hand, the measuring tube can also be implemented by lining a non-ferromagnetic metal tube, especially a stainless steel tube, internally with an insulating layer of a suitable synthetic material, especially of hard rubber, soft rubber or polyfluoroethylene, preferably polytetrafluoroethylene.

The magnetic field producing apparatus is arranged outside the measuring tube and secured completely touching, partially touching or with a fixed distance from, the measuring tube.

Advantageous embodiments of the invention are set forth in the dependent claims.

In an embodiment of the invention, for the test measurement, a rotationally asymmetric flow is produced by a disturbance installed at the inlet end area and comprising at least one disturbance source.

The test measurement can also serve for tuning the optimal angles $\alpha$ and $\beta$ and is then performed at the beginning, so that, based on the angle pair ($\alpha$–$\beta$), a flow-profile independent, magnetic-inductive flowmeter can be implemented.

The test measurement can include many different disturbance sources, which can all assume any installed angles. Because of the application of sufficiently different disturbances, the angles $\alpha$ and $\beta$ can be optimized such that the measuring error of a particular disturbance assumes a value of less than 0.05% and the maximum measurement error of any disturbance has a value of less than 0.5%.

It has been found that by the use of two sufficiently different disturbance sources, especially a diaphragm and a 90° elbow, a sufficiently good angle pair (α–β) can be ascertained for a magnetic-inductive flowmeter, in order to yield for some other disturbance a maximum measurement error of 0.5%. By taking additional disturbance sources into consideration in the test measurement, the optimized parameters change only marginally, whereby the resulting measurement error changes only slightly.

In an embodiment, the disturbance source comprises a diaphragm or a 90° elbow, wherein the diaphragm reduces the cross-section of the measuring tube by 10%, wherein the diaphragm has a chord, which limits the diaphragm toward the tube, wherein the diaphragm assumes a first diaphragm orientation or a second diaphragm orientation, wherein in the case of the first diaphragm orientation the chord is oriented perpendicular to the magnetic field and in the case of the second diaphragm orientation the chord is oriented in parallel with the magnetic field, wherein the 90° elbow assumes a first elbow orientation or a second elbow orientation, wherein the first elbow orientation is distinguished by a tube axis extending perpendicular to the magnetic field and to the longitudinal direction of the measuring tube and the second elbow orientation is distinguished by a tube axis extending in parallel with the magnetic field and perpendicular to the longitudinal direction of the measuring tube.

Up to now, the user of a magnetic-inductive flowmeter has been told to use a prescribed inlet path. The prescribed inlet path is necessary, in order to keep measurement error for the device within certain limits. The arising measurement error must be ascertained once per disturbance type, distance, mounting angle and, possibly, Reynolds number. This is done either by elaborate test series or by simulations of the flow conditions for different disturbances and evaluation of the calculated flow profiles. As a result of this step, one obtains data, which give the size of the measuring error, which would arise, when a magnetic-inductive flowmeter would be installed in the corresponding position and how large the measuring error would be, when the construction is supplemented with other electrode pairs or the magnetic field producing apparatus is adapted.

In an additional embodiment, the disturbance is installed with distance 0-DN from the inlet end area.

In a further development, an insensitivity is provided relative to a rotationally asymmetric flow profile at a Reynolds number of the medium in the measuring tube greater than or equal to 10,000, especially greater than or equal to 50,000 and preferably greater than or equal to 100,000.

In an additional embodiment, the flowmeter has three electrode pairs.

The electrode pairs do not necessarily have to be arranged diametrically opposite one another. The at least two electrode pairs are coupled with the measured medium galvanically or capacitively.

In an additional embodiment, in each case, at least two electrodes, especially all electrodes, located on one side of the measuring tube relative to the vertical measuring tube longitudinal plane are connected together.

The technical success of this embodiment of the invention comes from the fact that it was found that, by adapting the angles α and β, a sampling of the individual potential differences with accompanying empirically determined weighting factors is no longer necessary and the applied voltage across all electrodes in the case of a disturbance differs by less than 0.5% from a measured value ascertained in the case of a fully developed flow profile. A weighting of the individual voltage values is, thus, not necessary, whereby the evaluation unit for determining the voltage drop and the flow velocity resulting therefrom can be significantly simplified. It is sufficient then to convert the measured voltage value by means of a calibration into a flow velocity or a volume flow.

The electrodes are especially connected with one another by cable and preferably by a conductive piece of sheet metal. That provides a simple and stable assembly and delivers supplementally a cost-effective alternative to known solutions.

The electrodes are connected with a control- and evaluation unit, which delivers information concerning flow velocity and volume flow in the measuring tube based on the voltage induced in the electrodes.

According to the invention, the following holds for the angle α: $30° \leq \alpha \leq 60°$ and, especially, $40° \leq \alpha \leq 50°$.

According to the invention, the following holds for the angle β: $50° \leq \beta \leq 90°$ and, especially, $70° \leq \beta \leq 80°$.

The tuning of the angles α and β is performed with a simulation program or based on a test setup.

In an additional embodiment, the magnetic field producing apparatus includes at least one saddle coil or at least one pole shoe with superimposed coil for producing in the medium a magnetic field extending perpendicular to the longitudinal direction of the measuring tube.

Usually, the magnetic field producing apparatus includes two coil systems arranged diametrically opposite one another. In a conventional magnetic-inductive flowmeter, usually, saddle coils or pole shoes with superimposed coils are installed. They reach around the measuring tube and define a region, in which the magnetic field in the medium extends approximately uniformly, and perpendicular, to the abscissa axis.

In an additional embodiment, the electrodes are arranged axisymmetrically to the vertical measuring tube longitudinal plane.

In an additional embodiment, two neighboring electrodes located on a side of the measuring tube are spaced at an angle $\delta = \alpha/(N-1)$ in the cross-section, wherein the natural number N corresponds to the number of electrode pairs.

A measuring point of the invention includes a magnetic-inductive flowmeter of the invention and an elbow applied at a distance 0-DN at the inlet end area.

In an embodiment, the 90° elbow has a first elbow orientation or a second elbow orientation, wherein the first elbow orientation is distinguished by a tube axis extending perpendicular to the magnetic field and to the longitudinal direction and the second elbow orientation is distinguished by a tube axis extending in parallel with the magnetic field and perpendicular to the longitudinal direction.

In an embodiment, for the test measurement, a rotationally asymmetric flow is produced by the 90° elbow installed at the inlet end area, wherein the 90° elbow is in a first elbow orientation or a second elbow orientation.

Since for the measuring point in particular a 90° elbow is placed at the inlet end area of the measuring tube, the test measurements for ascertaining the optimal angle pair (α–β) are limited to a disturbance composed of a 90° elbow having a first elbow orientation or a second elbow orientation. A measuring point of the invention composed of a magnetic-inductive flowmeter in combination with a 90° elbow has a 90° elbow applied at the inlet end area of the measuring tube at a distance of 0-DN, and, due to the individual adapting of the angles α and β in the test measurements, a smaller measurement error than a magnetic-inductive flowmeter that is optimized for sufficiently different disturbance sources.

In an embodiment, the following holds for the angle α: 30°≤α≤60° and, especially, 40°≤α≤50°; while for the angle β: 50°≤β≤90° and, especially, 70°≤β≤80°.

In an embodiment, the measuring point includes a flowmeter with three electrode pairs.

In an embodiment, in each case, at least two electrodes, especially all electrodes, located on a side of the measuring tube relative to the vertical measuring tube longitudinal plane are connected together.

In an embodiment, the electrodes are connected together with a stamp-bend part.

BRIEF DESCRIPTION OF THE DRAWINGS

The invention will now be explained in greater detail in the following based on examples of embodiments with reference to the appended drawing, the figures of which show as follows.

DETAILED DESCRIPTION

Figure 1A:
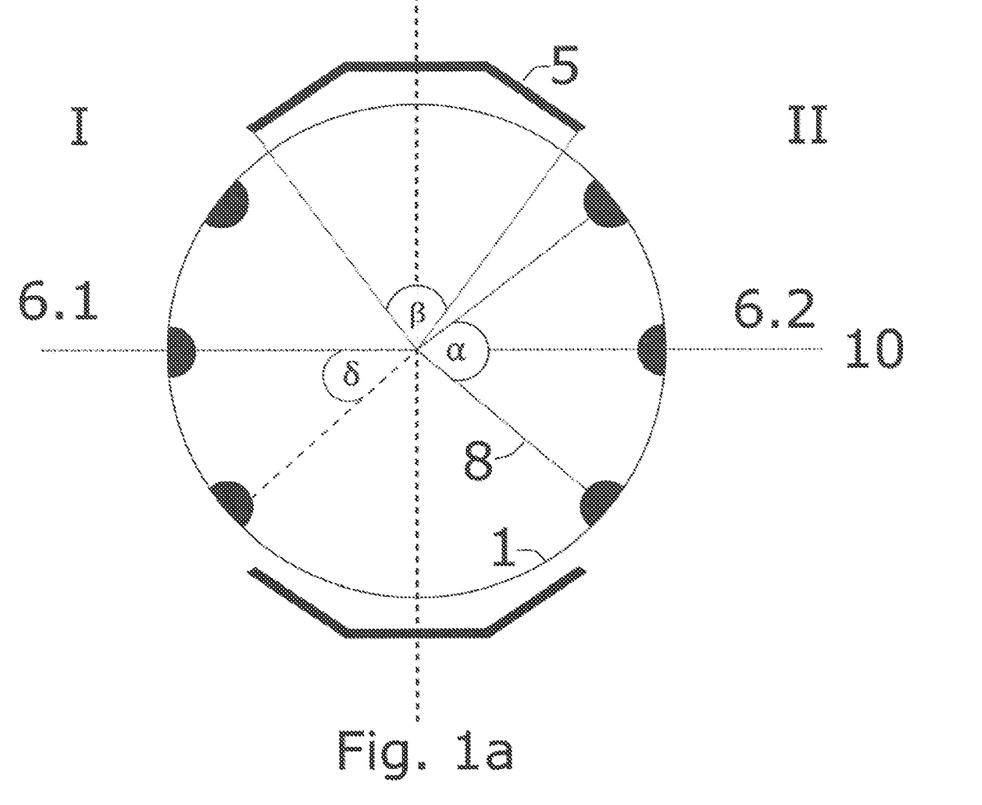
FIG. 1a shows a schematic view of a form of embodiment of the magnetic-inductive flowmeter of the present disclosure.

The construction and measuring principle of a magnetic-inductive flowmeter is basically known. FIG. 1a shows a schematic cross-section (9 in FIG. 1b) of a known magnetic-inductive flowmeter. Led through measuring tube (1) is a medium, which has an electrical conductivity. A magnetic field producing apparatus (5) is then placed such that the magnetic field lines extend perpendicular to a longitudinal direction (4) defined by the measuring tube axis. Suited as magnetic field producing apparatus (5) is preferably a saddle coil or a pole shoe with superimposed coil. In the case of applied magnetic field, there arises in the measuring tube (1) a distribution of potential, which can be sensed with two electrodes applied at the inner wall of the measuring tube (1). As a rule, these electrodes arranged are diametrically opposite one another and form an electrode axis, which extends perpendicular to the magnetic field lines and to the longitudinal direction (4). Based on the measured voltage, flow velocity u of the medium can be determined based on the magnetic flux density and volume flow V based further on the tube cross-sectional area. In order to prevent the voltage on the electrode system (6) from getting into the pipeline, the inner wall is lined with an insulating material. The magnetic field resulting, for example, from an electromagnet is produced by a clocked direct current of changing polarity. This assures a stable zero-point and makes the measuring insensitive to influences of multiphase materials, inhomogeneities in the liquid or small conductivity.

According to the invention, at least two electrode pairs are used for determining volume flow $\dot{V}$. FIG. 1a shows schematically, by way of example, a magnetic-inductive flowmeter having three electrode pairs.

Besides the electrode system (6), which serves for sensing a potential difference, often additional electrodes in the form of measured substance monitoring- or grounding electrodes are installed in the measuring tube (1). These additional electrodes serve to measure an electrical reference potential or to detect partially filled measuring tubes (1) or to register the temperature of the medium by means of installed temperature detectors. Such are not shown in the schematic view of FIG. 1.

In such case, a first electrode (6.1) of an electrode pair lies on the first side (I) of the measuring tube (1) and a second electrode (6.2) of the electrode pair on the second side (II) of the measuring tube (1). The externally lying electrodes of a side define an angle α in the cross-section (9). The additional electrodes are distributed within the indicated circular segment, preferably at the inner wall of the measuring tube (1).

In the case of the flowmeter shown in FIG. 1a, the electrode system (6) is located in direct contact with the medium; the coupling can, however, such as indicated above, also occur capacitively.

Figure 1B:
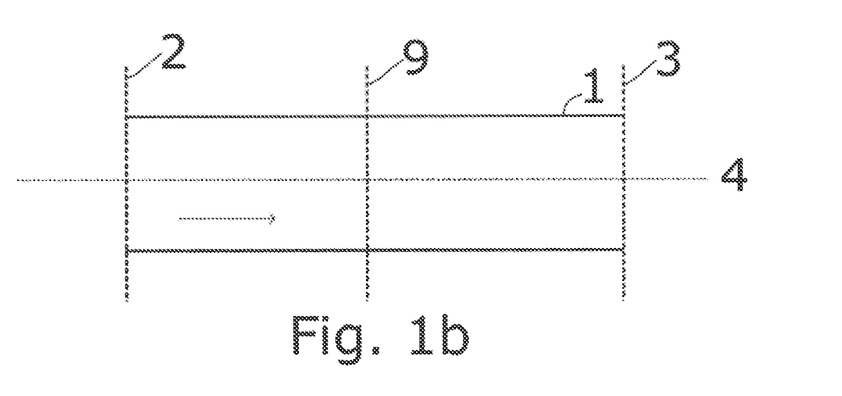
FIG. 1b shows a schematic view of a longitudinal section of a measuring tube.

A magnetic-inductive flowmeter includes an inlet end area (2) and an outlet end area (3) (see FIG. 1b). An arrow in FIG. 1b indicates the flow direction of the medium. A 90° elbow (90° E) connected to the inlet end area (2) or a diaphragm (B) affects the flow profile of the medium to create a rotationally asymmetric flow profile in the measuring tube (1).

The magnetic field producing apparatus (5) is usually so designed that the magnetic field lines are distributed as uniformly as possible over the cross-section (9) of the measuring tube. In this way, especially in the case of fully developed flow profiles, measurement errors of less than 0.2% can be achieved. In the case of a rotationally asymmetric flow profile, a uniform magnetic field can act disadvantageously on the accuracy of measurement. This problem can be solved according to the invention by adapting the magnetic field producing apparatus (5), especially by adapting the angle β.

By varying the angle which describes the extent to which a segment of the magnetic field producing apparatus (5) applied on the measuring tube (1) passes around the measuring tube (1), one obtains an additional degree of freedom for reducing the measuring error. A segment coupling the magnetic field into the medium can comprise a pole shoe, which has two legs, even in the form of two circular arcs, adjoining a planar area. Alternatively, a pole shoe can also have completely the shape of a circular arc. In general, a segment coupling the magnetic field into the medium can have any contour, composed of at least one additional segment. For ascertaining the maximum angle β, the segments are taken into consideration, which are essentially responsible for coupling the magnetic field into the medium.

The measurement errors of flow velocity u and volume flow $\dot{V}$ are $$\Delta_u = \left|\frac{u_{va} - u_S}{u_{va}}\right| \text{ and } \Delta_{\dot{V}} = \left|\frac{\dot{V}_{va} - \dot{V}_S}{\dot{V}_{va}}\right|,$$

respectively, wherein flow velocity $u_{va}$ and volume flow $\dot{V}_{va}$ are determined in the case of a flow with fully developed flow profile, and flow velocity $u_S$ and volume flow $\dot{V}_S$ are determined in the case of a rotationally asymmetric flow profile. In such case, the real volume flow $\dot{V}_{real}$ is in both cases identical and optimally equals the measured volume flow $\dot{V}_{va}$ for fully developed flow profile.

In simulations, a magnetic-inductive flowmeter with three electrode pairs forms the basis for calculating the optimal parameters. The area of the electrodes is greater than point shaped, however, of finite size. The optimizing of the angles α and β proceeds in steps as follows:

In a first step, the angles α and β are so adapted that the measuring error of flow velocity in test measurements with an individual disturbance is minimum. In such case, the disturbance is generated by a diaphragm (B) or a 90° elbow (90° E).

Figure 2A:
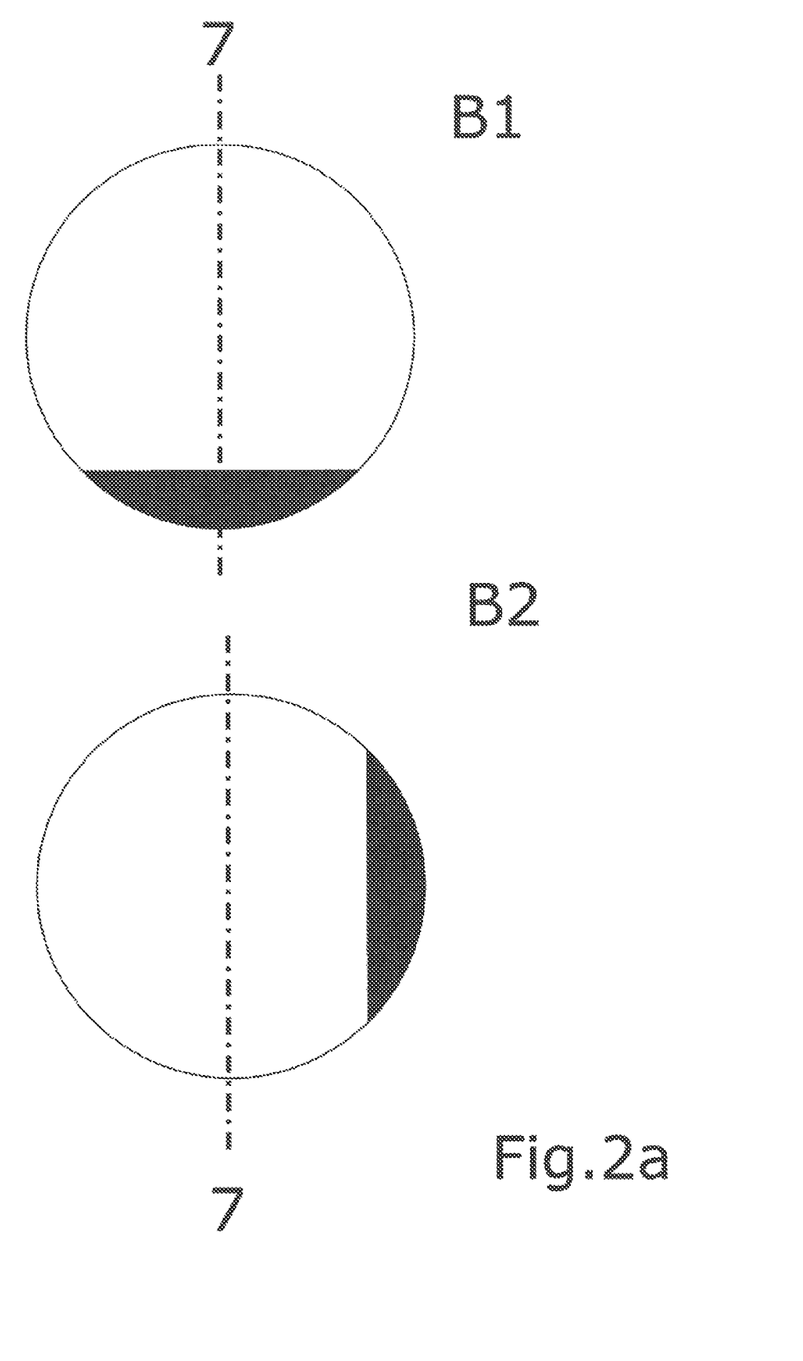
FIG. 2a shows two schematic views of a diaphragm with a first diaphragm orientation and a second diaphragm orientation, respectively.
Figure 2B:
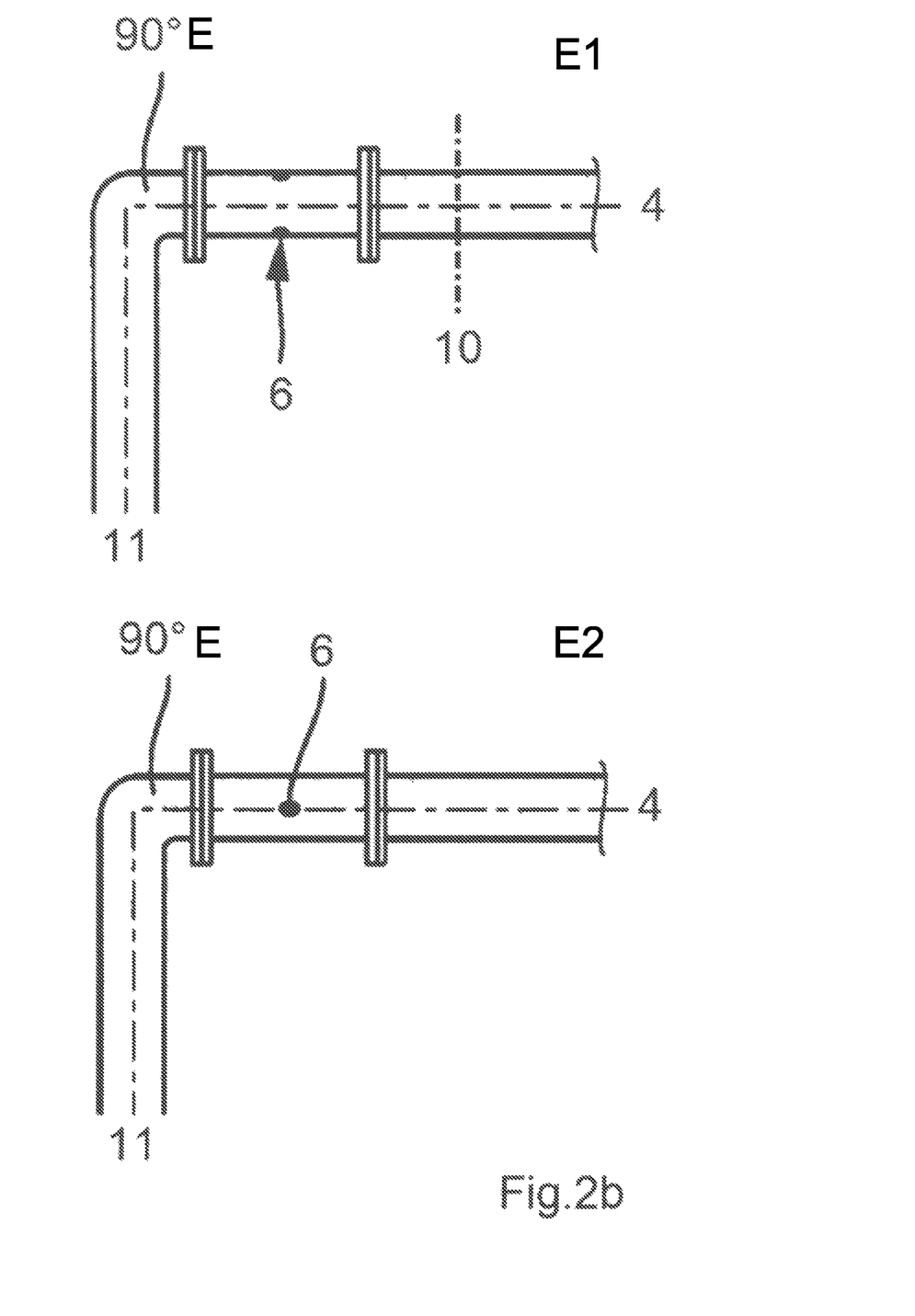
FIG. 2b shows two schematic views of a 90° elbow with a first elbow orientation and a second elbow orientation, respectively.

The diaphragm (B), in such case, blocks 10% of the tube cross-section (9) and has a chord, which limits the diaphragm toward the tube. A first diaphragm orientation (B1) or a second diaphragm orientation (B2) is assumed, these being rotated especially by 90° relative to one another. In such case, the chord in the case of the first diaphragm orientation (B1) is oriented perpendicular to the magnetic field and in the case of the second diaphragm orientation (B2) parallel to the magnetic field. The first diaphragm orientation (B1) and the second diaphragm orientation (B2) of a diaphragm (B) are schematically shown in FIG. 2a. The black filled circular segment represents, in such case, the area, which blocks a portion of the cross-sectional area of the measuring tube. In the test measurement, the diaphragm (B) is placed at a distance of 0-DN relative to the inlet end area (2). Alternatively, a 90° elbow (90° E) is connected to the input of the inlet end area (2) at a distance of 0-DN, wherein the 90° elbow (90° E) assumes a first elbow orientation (E1) or a second elbow orientation (E2), these being rotated especially by 90° relative to one another. The first elbow orientation (E1) and the second elbow orientation (E2) of a 90° elbow (90° E), respectively, are shown schematically in FIG. 2b. The selecting of the angles α and β is preferably performed for the two disturbances in their two orientations.

In the second step, that angle pair is determined, whose maximum measurement error for all performed test measurements is minimum.

Figure 4:
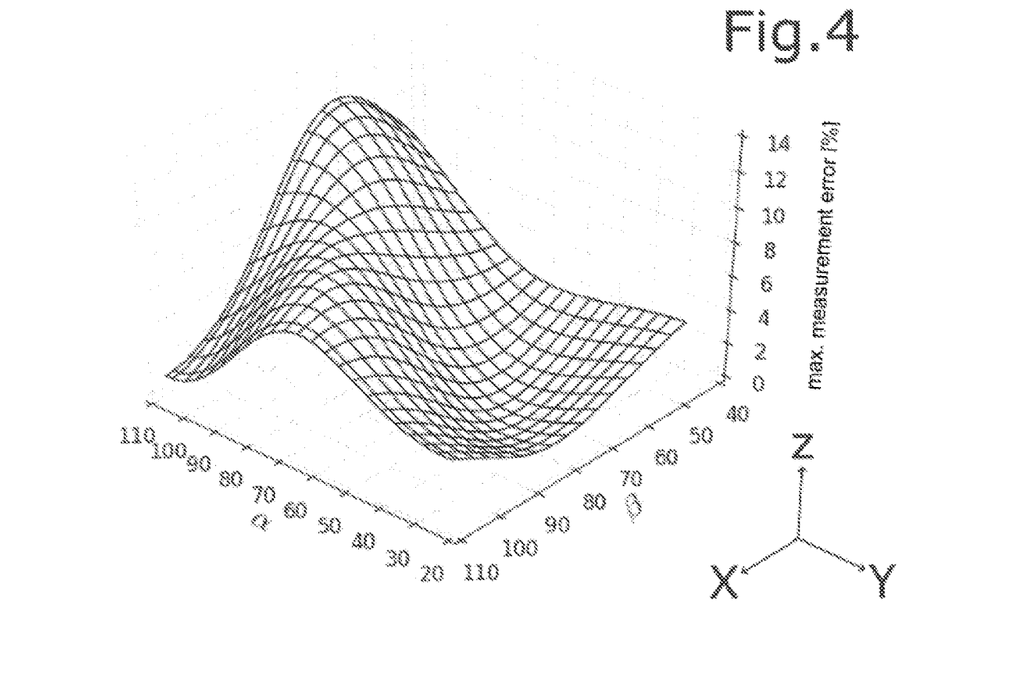
FIG. 4 shows a graph of measuring error as a function of the angles α and β for an 80-DN measuring tube, wherein the x-axis is β in degrees (°), the y-axis is α in degrees(°) and the z-axis is the maximum measurement error in percent (%)

Shown in FIG. 4, by way of example, is the simulated measurement error (Z axis) for a 500-DN measuring tube (1) as a function of the angle α (Y axis) and the angle β (X axis). Based on this, the minimum of the measuring error is ascertained for a specific disturbance, here an elbow (90° E) optimized as regards first and second elbow orientations (E1, E2). In such case, the first elbow orientation (E1) is distinguished by a tube axis (11) extending perpendicular to the magnetic field and to the longitudinal direction (4) and the second elbow orientation (E2) by a tube axis (11) extending in parallel with the magnetic field and perpendicular to the longitudinal direction (4) (see FIG. 2b). This procedure is repeated for all above mentioned disturbances, wherein in the last step that angle pair is ascertained, which has the smallest measurement error with reference to all test measurements. The values for the angles α and β are adjusted until the resulting measurement error for all test measurements is less than 0.5%, preferably less than 0.2%.

Figure 3:
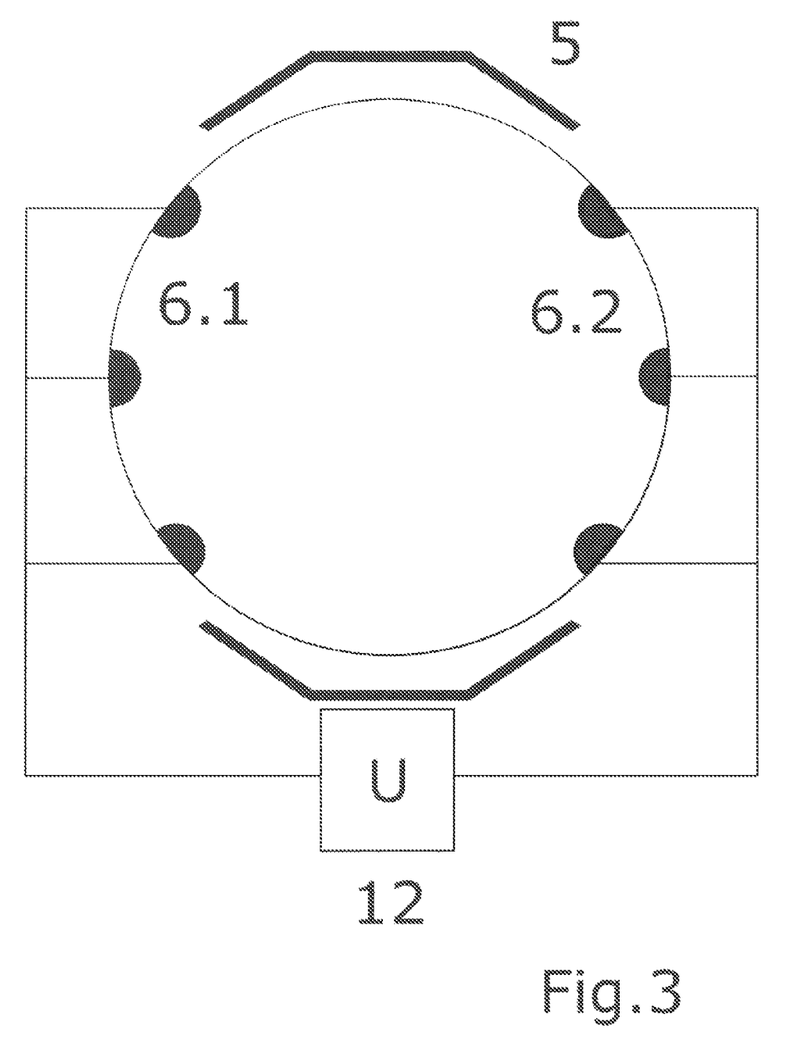
FIG. 3 shows a schematic view of an embodiment of the measuring configuration, in which, in each case, all electrodes located on a side are connected together.

FIG. 3 shows a preferred measuring configuration, in which the individual electrodes located on each side are connected together. The measured voltage corresponds to an average voltage over all electrodes. For example, the electrodes on a side are connected together by individual cables or with a form fitted piece of sheet metal and all electrodes are connected with a control- and evaluation unit (12).

Figure 5:
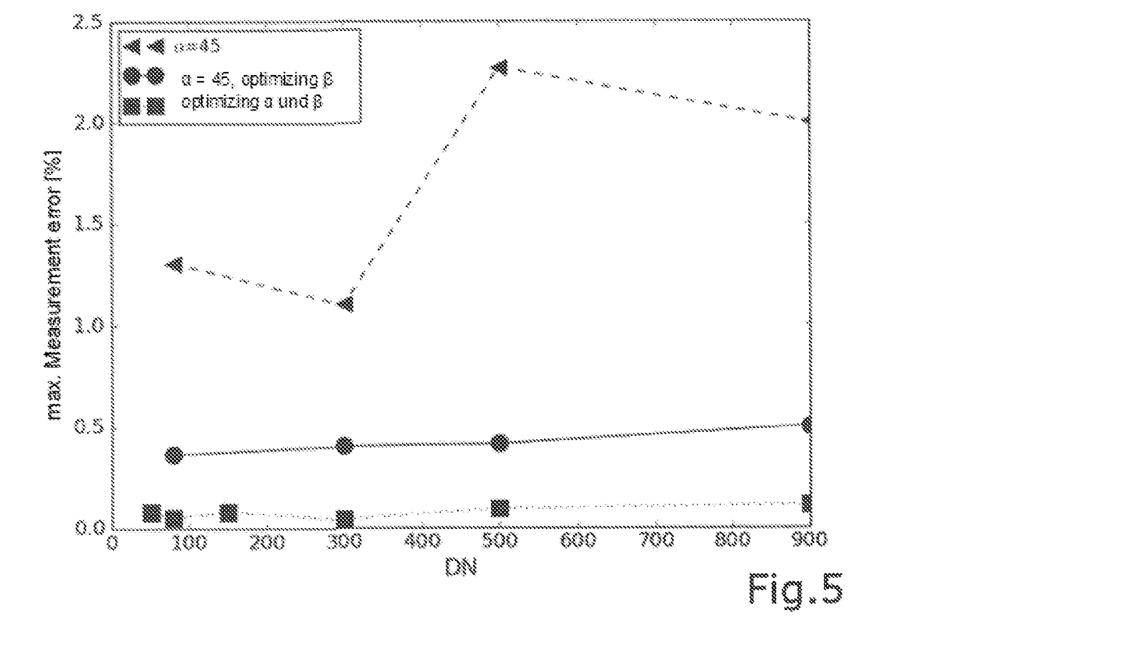
FIG. 5 shows a graph of maximum deviation of the measured flow velocity due to a disturbed flow profile as a function of nominal diameter of the measuring tube for three different electrode and magnetic field producing apparatus configurations applying three electrode pairs, wherein the x-axis is the nominal diameter in DN values and the y-axis is the maximum measurement error in percent (%).

FIG. 5 shows maximum measurement error of the measured flow velocity due to a disturbed flow profile as a function of the nominal diameter of the measuring tube (1) for three different electrodes- and magnetic field producing apparatus configurations using three electrode pairs. The maximum measurement error results, in such case, from the greatest measurement error for the angle pair (α–β) relative to all performed test measurements. The triangles show the maximum measurement error for a magnetic-inductive flowmeter with an angle which is used, for example, in the case of a magnetic-inductive flowmeter of the series, Promag W, of the firm, Endress+Hauser. Used for the angle α is 45° according to EP 0 878 694 A1. By optimizing the weighting of the ascertained voltage values, one obtains a maximum measurement error of 1% for a measuring tube (1) of 50-DN and a maximum measurement error of 2.25% for a measuring tube (1) of 900-DN. The circles show results from simulations, in the case of which also the angle β is varied for optimizing. The angle α is kept constant at 45°. Because of the application of β as supplemental optimizing parameter, the measuring error can be significantly reduced in the presence of an asymmetric flow profile. The squares show results from simulations in the case of which supplementally to the varying of angle β also the angle α, which defines the electrode region, is varied for optimizing.

In such case, weighting the individual voltages on the electrode pairs is omitted, corresponding to a connecting of the electrodes on each side together. In this way, the measurement error occurring due to a rotationally asymmetric flow profile can again be cut in half. For ascertaining the optimal angles α and β, disturbances used were a diaphragm (B) with a first diaphragm orientation (B1), a diaphragm (B) with a second diaphragm orientation (B2), a 90° elbow (90° E) with a first elbow orientation (E1) and a 90° elbow (90° E) with a second elbow orientation (E2).

Based on the above described optimizing method, a magnetic-inductive flowmeter with three electrode pairs, a 150-DN measuring tube (1) and a medium having a flow velocity of 1 m/s has a measurement error of 0.15% in the case of a diaphragm (B) installed with diaphragm orientation (B1) and a measurement error of 0.01% in the case of a diaphragm (B) installed with diaphragm orientation (B2).

Based on the above described optimizing method, a magnetic-inductive flowmeter with three electrode pairs, a 150-DN measuring tube (1) and a medium having a flow velocity of 1 m/s has a measurement error of 0.05% in the case of a 90° elbow (90° E) installed with elbow orientation (E1) and a measurement error of 0.02% in the case of a 90° elbow (90° E) installed with elbow orientation (E2).

Based on the above described optimizing method, a magnetic-inductive flowmeter with three electrode pairs, a 300-DN measuring tube (1) and a medium having a flow velocity of 1 m/s has a measurement error of 0.04% in the case of a diaphragm (B) installed with diaphragm orientation (B1) and a measurement error of 0.21% in the case of an diaphragm (B) installed with diaphragm orientation (B2).

Based on the above described optimizing method, a magnetic-inductive flowmeter with three electrode pairs, a 300-DN measuring tube (1) and a medium having a flow velocity of 1 m/s has a measurement error of 0.04% in the case of a 90° elbow (90° E) installed with elbow orientation (E1) and a measurement error of 0.15% in the case of a 90° elbow (90° E) installed with elbow orientation (E2).

Based on the above described optimizing method, a magnetic-inductive flowmeter with three electrode pairs, a 500-DN measuring tube (1) and a medium having a flow velocity of 1 m/s has a measurement error of 0.07% in the case of a diaphragm (B) installed with diaphragm orientation (B1) and a measurement error of 0.04% in the case of a diaphragm (B) installed with diaphragm orientation (B2).

Based on the above described optimizing method, a magnetic-inductive flowmeter with three electrode pairs, a 500-DN measuring tube (1) and a medium having a flow velocity of 1 m/s has a measurement error of 0.18% in the case of a 90° elbow (90° E) installed with elbow orientation (E1) and a measurement error of 0.09% in the case of a 90° elbow (90° E) installed with elbow orientation (E2).

The invention claimed is:

1. A magnetic-inductive flowmeter for measuring flow velocity or volume flow of a medium, the flowmeter comprising:
a measuring tube adapted to convey the medium in a longitudinal direction defined by a measuring tube axis, wherein the measuring tube includes an inlet end area and an outlet end area, which delimit the measuring tube in the longitudinal direction;
a magnetic field producing apparatus disposed about a cross-section of the measuring tube and configured to generate a magnetic field in the medium extending essentially perpendicular to the longitudinal direction, wherein the magnetic field producing apparatus includes a segment configured to couple the magnetic field into the medium and applied on, or at a predetermined minimum distance from, the measuring tube, wherein the segment surrounds the measuring tube over a first angle, which defines a maximum angle of arc in the cross-section of the measuring tube; and
an electrode system including at least two electrode pairs, which are adapted to detect a voltage in the medium induced perpendicular to the magnetic field and to the longitudinal direction, wherein a vertical measuring tube longitudinal plane defines a first side and a second side of the measuring tube, wherein a first electrode of an electrode pair of the at least two electrode pairs is disposed on the first side of the measuring tube, wherein a second electrode of the corresponding electrode pair is disposed on the second side, wherein a second angle in the cross-section of the measuring tube defines a minimum circular sector in which the respective first electrodes of the at least two electrode pairs disposed on the first side of the measuring tube are distributed,
wherein the first angle and second angle are so matched to each other that the flowmeter is insensitive to departures from a rotationally symmetric flow to a degree such that, in a test measurement, the flowmeter provides a measurement error of flow velocity and/or a measurement error of volume flow of less than 1.0%, wherein the flow velocity and/or the volume flow are/is determined given a flow with fully developed flow profile of the medium, and wherein the flow velocity and/or the volume flow are/is determined given a rotationally asymmetric flow of the medium.

2. The flowmeter of claim 1, wherein, for the test measurement, the rotationally asymmetric flow is generated by a disturbance disposed adjacent the inlet end area and comprising at least one disturbance source.

3. The flowmeter of claim 2, wherein:
the disturbance source comprises a diaphragm or a 90° elbow;
when the disturbance source is a diaphragm, the diaphragm reduces the cross-section of the measuring tube by about 10%;
when the disturbance source is a diaphragm, the diaphragm has a chord that limits the diaphragm toward the tube;
when the disturbance source is a diaphragm, the diaphragm assumes a first diaphragm orientation or a second diaphragm orientation, wherein, in the case of the first diaphragm orientation, the chord is oriented perpendicular to the magnetic field and, in the case of the second diaphragm orientation, the chord is oriented in parallel with the magnetic field; and
when the disturbance source is a 90° elbow, the 90° elbow assumes a first elbow orientation or a second elbow orientation, wherein the first elbow orientation is defined relative to a first tube axis extending perpendicular to the magnetic field and to the longitudinal direction of the measuring tube, and wherein the second elbow orientation is defined relative to a second tube axis extending in parallel with the magnetic field and perpendicular to the longitudinal direction of the measuring tube.

4. The flowmeter of claim 3, wherein the disturbance is disposed at a distance of 0-DN from the inlet end area.

5. The flowmeter of claim 1, wherein the flowmeter is substantially insensitive to departures from the rotationally asymmetric flow profile at a Reynolds number of the medium in the measuring tube greater than or equal to 10,000.

6. The flowmeter of claim 1, wherein the flowmeter comprises three electrode pairs.

7. The flowmeter of claim 1, wherein at least two first electrodes or at least two second electrodes of the at least two electrode pairs that are disposed on the first or second side of the measuring tube, respectively, are connected.

8. The flowmeter of claim 1, wherein the second angle is greater than or equal to 30° and less than or equal to 60°.

9. The flowmeter of claim 1, wherein the first angle is greater than or equal to 50° and the less than or equal to 90°.

10. The flowmeter of claim 1, wherein the second angle is greater than or equal to 40° and less than or equal to 50°, and wherein the first angle is greater than or equal to 70° and the less than or equal to 80°.

11. The flowmeter of claim 1, wherein the magnetic field producing apparatus comprises at least one saddle coil or at least one pole shoe with superimposed coil, either configured to generate a magnetic field in the medium extending perpendicular to the longitudinal direction.

12. The flowmeter of claim 1, wherein the electrodes are arranged axisymmetrically to the vertical measuring tube longitudinal plane.

13. The flowmeter of claim 1, wherein two adjacent first electrodes or two adjacent second electrodes of the at least two electrode pairs disposed on either the first or second side of the measuring tube, respectively, are spaced at a third angle in the cross-section of the measuring tube, the third angle defined as $\alpha/(N-1)$, wherein a is the second angle and N is a natural number corresponding to the number of the at least two electrode pairs.

14. The flowmeter of claim 1, wherein wherein the first angle and second angle are so matched to each other that the flowmeter is insensitive to departures from a rotationally symmetric flow to a degree such that, in the test measurement, the flowmeter provides a measurement error of flow velocity and/or a measurement error of volume flow of less than 0.5%.

15. A measuring point for determining a flow-profile independent flow velocity or volume flow of a medium, the measuring point comprising:
- a magnetic-inductive flowmeter configured to measure the flow velocity or volume flow of the medium, comprising:
  - a measuring tube adapted to convey the medium in a longitudinal direction defined by a measuring tube axis, wherein the measuring tube includes an inlet end area and an outlet end area, which delimit the measuring tube in the longitudinal direction;
  - a magnetic field producing apparatus disposed about a cross-section of the measuring tube and configured to generate a magnetic field in the medium extending essentially perpendicular to the longitudinal direction, wherein the magnetic field producing apparatus includes a segment configured to couple the magnetic field into the medium and applied on, or at a predetermined minimum distance from, the measuring tube, wherein the segment surrounds the measuring tube over a first angle, which defines a maximum angle of arc in the cross-section of the measuring tube;
  - an electrode system including at least two electrode pairs, which are adapted to detect a voltage in the medium induced perpendicular to the magnetic field and to the longitudinal direction, wherein a vertical measuring tube longitudinal plane defines a first side and a second side of the measuring tube, wherein a first electrode of an electrode pair of the at least two electrode pairs is disposed on the first side of the measuring tube, wherein a second electrode of the corresponding electrode pair is disposed on the second side, wherein a second angle in the cross-section of the measuring tube defines a minimum circular sector in which the respective first electrodes of the at least two electrode pairs disposed on the first side of the measuring tube are distributed,
  - wherein the first angle and second angle are so matched to each other that the flowmeter is substantially insensitive to departures from a rotationally symmetric flow, and
  - wherein, in a test measurement, the flowmeter provides a measurement error of flow velocity and/or a measurement error of volume flow of less than 1.0%, wherein the flow velocity and/or the volume flow are/is determined given a flow with fully developed flow profile of the medium, and wherein the flow velocity and/or the volume flow are/is determined given a rotationally asymmetric flow of the medium; and
- a 90° elbow arranged at a distance of 0-DN at the inlet end area.

16. The measuring point of claim 15, wherein the 90° elbow assumes a first elbow orientation or a second elbow orientation, wherein the first elbow orientation is defined relative to a first tube axis extending perpendicular to the magnetic field and to the longitudinal direction of the measuring tube, and wherein the second elbow orientation is defined relative to a second tube axis extending in parallel with the magnetic field and perpendicular to the longitudinal direction of the measuring tube.

17. The measuring point of claim 16, wherein, for the test measurement, the rotationally asymmetric flow is generated by the 90° elbow arranged at the inlet end area, and wherein the 90° elbow is in the first elbow orientation or the second elbow orientation.

18. The measuring point of claim 15, wherein the second angle is greater than or equal to 30° and less than or equal to 60°, and wherein the first angle is greater than or equal to 50° and the less than or equal to 90°.

19. The measuring point of claim 15, wherein the second angle is greater than or equal to 40° and less than or equal to 50°, and wherein the first angle is greater than or equal to 70° and the less than or equal to 80°.

20. The measuring point of claim 15, wherein the flowmeter of the measuring point comprises three electrode pairs.

21. The measuring point of claim 15, wherein at least two first electrodes or at least two second electrodes of the at least two electrode pairs that are disposed on the first or second side of the measuring tube, respectively, are connected.

22. The measuring point of claim 21, wherein the at least two first electrodes or the at least two second electrodes are connected by a stamp-bend part.

* * * * *